April 23, 1946.  J. SCHADE  2,399,062
METHOD OF MAKING RING BINDER STRUCTURE
Filed Dec. 20, 1943  2 Sheets-Sheet 1
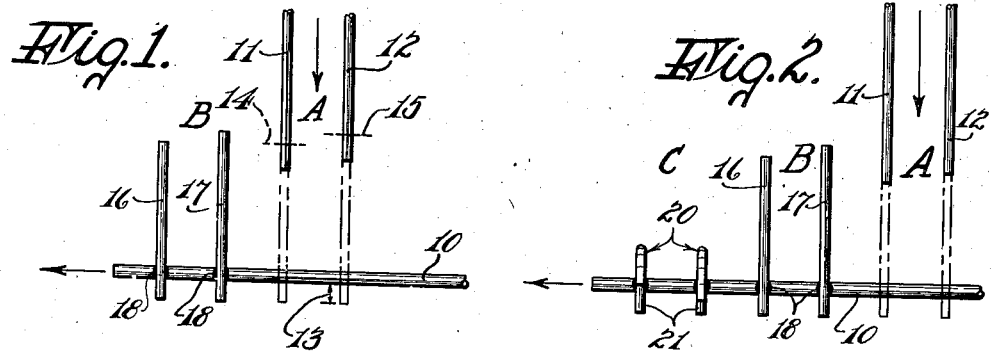
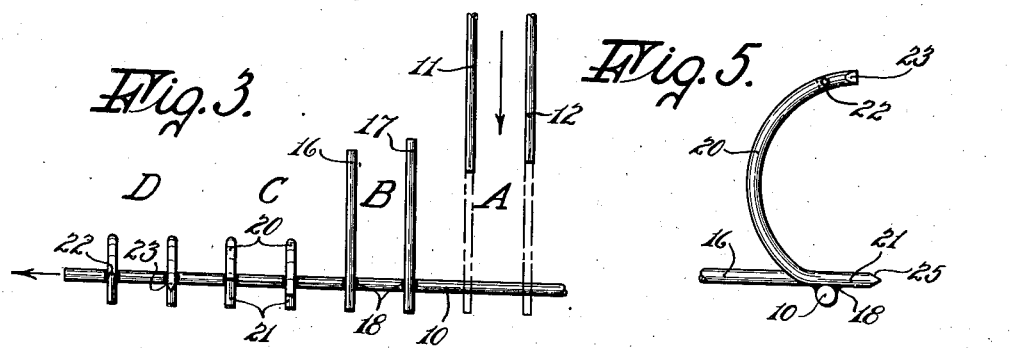
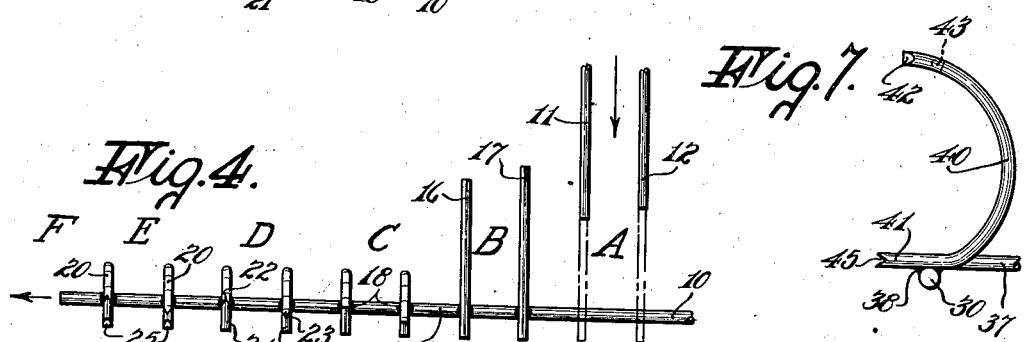
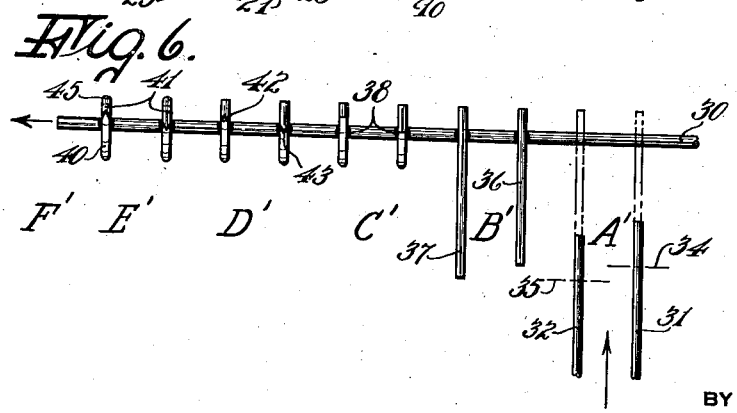
INVENTOR
JOHN SCHADE
BY
Chapin & Neal
ATTORNEYS

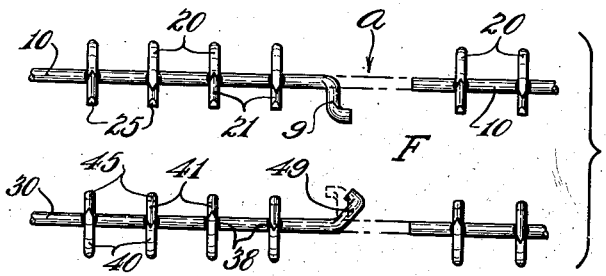
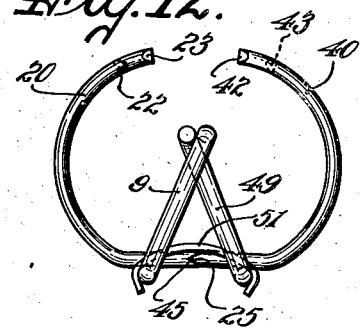
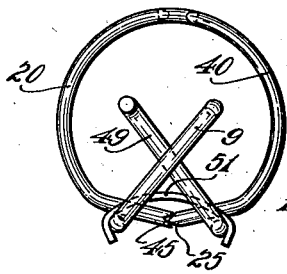
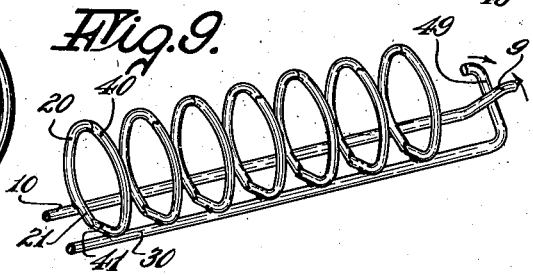
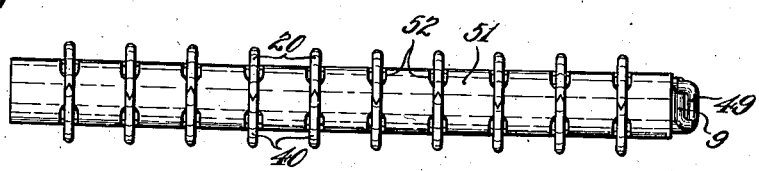
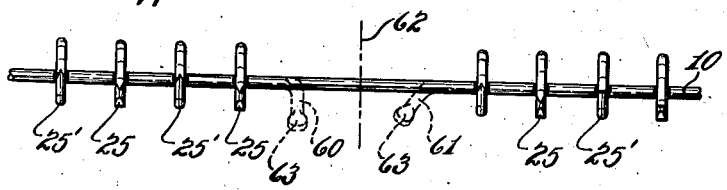
INVENTOR
JOHN SCHADE
BY
Chapin + Neal
ATTORNEYS Patented Apr. 23, 1946

2,399,062

UNITED STATES PATENT OFFICE 2,399,062

METHOD OF MAKING RING BINDER STRUCTURE

John Schade, Holyoke, Mass., assignor to National Blank Book Company, Holyoke, Mass., a corporation of Massachusetts Application December 20, 1943, Serial No. 514,922

6 Claims. (Cl. 140—88)

This invention relates to an improved method of making the prong and toggle frame structure of loose leaf ring binders.

In my companion application, Serial Number 514,920, Patent No. 2,368,730, patented Feb. 6, 1945, I have disclosed a method for which the present is in some respect an alternative. One of the objects of the present method is to permit the use of various forms of toggle connection while retaining many of the advantageous features of my other method. Other and further objects will be made apparent in the following specification and claims.

In the accompanying drawings which illustrate one manner of carrying out the method, Fig. 1 shows the manner of assembling the ring forming elements on one of the two supporting frame members, which are included in the final structure, and welding their intersection;

Fig. 2 shows some of the assembled and welded parts carried through the first ring shaping step;

Fig. 3 is like Fig. 2 with a second shaping step indicated;

Fig. 4 is like Fig. 3 with a third shaping step indicated;

Fig. 5 is an end view of Fig. 4;

Fig. 6 is a view similar to Fig. 4 but showing the assembly and shaping of parts reversed as in making the other frame member;

Fig. 7 is an end view of Fig. 6;

Fig. 8 is a view of both frame members similar to Figs. 4 and 6 but showing an additional optional shaping step;

Fig. 9 is a perspective view showing the frame parts ready to be assembled into the spring plate;

Fig. 10 is a plan view of the assembled ring binder mechanism including the spring plate;

Figs. 11 and 12 are end views respectively showing the rings closed and open; and Fig. 13 indicates a modified arrangement of method steps.

In carrying out my method as illustrated in the drawings, a wire 10 of indefinite length is advanced intermittently in the direction of the arrow in Fig. 1 and succeeding figures. While the wire 10 is at rest at a station A, the end portions of a pair of wires 11 and 12 of indefinite length are advanced, as shown in dotted lines in Fig. 1, across and above the wire 10 at right angles therewith. The cross wires may be positioned singly or in groups of any desired number but the paired relation shown is preferred. The wires 11 and 12 are advanced so as to carry their free ends equal distances beyond the wire 10 as at 13. The wires 11 and 12 are then welded to wire 10 at their points of intersection and cut at points 14 and 15 to leave their end portions 16 and 17 welded to the wire as indicated at 18. For reasons later described the portions 16 and 17 are preferably made of different length. After the welding and cutting operation the wire 10 is advanced to position the wire to receive a second pair of cross wires 16 and 17, and position the first pair at a second station B. At each period of rest of wire 10 at station A, or at selected periods of rest, a pair of cross wires is advanced into position across the wire 10 welded thereto and cut as described. At station B or the immediately subsequent station C (Fig. 2), or partly at B and partly at C, the longer extending portions of the elements 16 and 17 are bent into a general arcuate shape, as best shown at 20 in Fig. 5, to form the paper receiving prongs of the binder mechanism. The short extending portions 21, which are to form one element of the toggle, are left straight. At a subsequent station D the free ends of portions 20 of members 16 and 17 are die-cut or otherwise formed to a vertical wedge shape 22 and a vertical V-shaped recess 23, respectively, as shown in Fig. 3. At a subsequent station E, Fig. 4, the free ends of portions 21 are both given a horizontal wedge shape as at 25.

In a similar manner as indicated, a second wire 30 is intermittently advanced, in parallel relation with wire 10, past stations A', B', C', D' and E' as shown in Fig. 6. The operations at the several stations are the same as those previously described except that the relative position of the long and short portions 36 and 37 cut from the length 31 and 32 and welded (as at 38) to the wire 30 at station A' are reversed, as are the positions of the end forming cutters. The portions 36 and 37 are formed at stations B' or C', or at both, into portions 40 and 41 complementary to portions 20 and 21. At station D' the free ends of the curved portions 40 of cross pieces 36 and 37 are cut or otherwise formed to a vertical-wedge shape 42, and a vertical V-shaped recess 43, respectively. At station E' the free ends of portions 41 are both formed with a horizontal V-shaped recess 45, see Fig. 7.

Sections, including the desired number of prongs 20 and 40, may be cut from wires 10 and 30 and will each form half of a prong assembly which may be combined as shown in Fig. 9, to make a complete ring assembly. The wedge shaped end 25 engages in the V-shaped recesses 45, as best shown in Figs. 11 and 12, to form the hinge of a toggle. The binder mechanism is completed by seating the cut-off sections of wires 10 and 30 in the hook shaped side of a spring plate 51 as shown in Figs. 10, 11 and 12. The spring plate is provided with openings 52 through which the prongs extend. The spring plate holds the formed ends of the portions 21 and 41 in hinged relation but yields sufficiently to permit the toggle to be forced past its center as the prongs are moved from the closed position of Fig. 11 to the open position of Fig. 12.

The prong assemblies may be made in long lengths and binder mechanisms having any desired number of prongs may be formed by cutting an appropriate length from each of the wires 10 and 30 and combining them as described.

Preferably the operations on the two wires 10 and 30 are carried out simultaneously, the wires being advanced in parallel relation through the forming machines, but the wires could, of course, be treated separately.

It is sometimes desirable to have a prong opening device at one end of the completed mechanism, as shown in Figs. 9 and 10. It consists of two bent ends, 9 and 49 of the wires 10 and 30. These bent up ends are crossed as shown. By pressing these as finger pieces in the direction of the arrows, the prongs are easily opened.

Such opening device is preferably provided for in my method in the following way. After the wires 10 and 30 have been supplied, during successive periods of rest at stations A and A' with the desired number of cross members to form the desired number of prongs for a given size of binder the wires may be fed forward without receiving cross wires for a length, indicated at a in Fig. 8, sufficient to furnish a bare length of wire from which the handles 9 and 49 may be formed, as indicated in dotted lines in Fig. 8. After the long wires have been cut off rearwardly of the formed set of prongs, as at a cutting station F, the bare portions are shaped as shown in Fig. 8. The hooked ends are here positioned so as not to engage, to facilitate assembly of the many structures in plate 51. After the assembly with the spring plate has been made, the finger piece 49 is bent toward piece 9 to bring them into engagement as shown in Fig. 10.

It will be understood that if desired, the cut at F may be so timed as to sever the wires 10 and 30 adjacent the last prongs of the preceding ring assemblies so that the bare portions from which the handles are to be formed project from the forward end of the assemblies still being worked on instead of extending rearwardly from the finished assemblies as shown.

Considering the completed assembly Fig. 10, it will be seen that the upper ends of the prongs do not meet in the same longitudinal and vertical plane. The meeting points are staggered with the prongs of alternate rings meeting in the same planes. This is an advantage in the easier threading of the prongs of the hole punched loose leaf sheets, particularly when the rings are closely spaced. The sheet first threads every other prong in every other hole, and this holds it in position to engage the remaining prongs. When all of the ring prongs need to engage all the holes at one time, the proper alignment is sometimes difficult to get, particularly when there are many rings and many holes to be engaged. The desired staggering of the ends in two, or even more, vertical and horizontal planes is easily accomplished in the use of my present method since the desired results are obtained by merely adjusting the points at which the cross portions 16, 17, 36, and 37 are cut from the cross feed wires.

As previously described the mating ends of the ring prongs are cut into complementary fitting interengaging V-form. It is desirable to make these forming cuts starting from underneath and cutting outwardly. This will avoid even the smallest burr being left on the lower edges of the cuts. Thus when the sheets are turned on the rings in the finished structure, they will pass smoothly over the under side of the rings. My present method also facilitates the inclusion of this refinement since ample space can be provided at the sides of the traveling wires 10 and 30 for the necessary cutting instrumentalities.

In Fig. 13 is shown a modified arrangement which indicates how, if desired, the prong assemblies to form a complete ring assembly may be cut from the same long wire, as 10 for example. The cross pieces are fed, welded in place and formed into prongs as previously described and shown in relation to wire 10 in Figs. 1 to 5 inclusive with the following exception. Instead of shaping the free ends of the toggle parts 21 to wedge form as shown at 25 the said members are alternately shaped to wedge and V-recess form as shown at 25 and 25' respectively in Fig. 13. By this arrangement two sections cut from the assembly on wire 10 may be matched together to form a complete ring assembly, by seating the alternate wedge ends 25 of one section in the alternate V-recesses 25' of the other to form the toggle connections. This has the advantage that only one forming assembly is needed. When this arrangement is used and it is desired to form operating handles, the handles for the mating sections are formed adjacent each other as shown in Fig. 13. The length of wire 10 left bare is sufficient to form two handles 60 and 61. The cut is made centrally of the bare section as at 62 and the handles bent outwardly. The ends 63 may be swaged or otherwise formed to a finished shape. For reasons previously described one of the handles as 61 is not bent to final position until the assembly in spring plate 51 is made. Since the handles for the two sections are made adjacent each other it will be understood that the cut at the other ends of the sections will be made between adjacent rings without provision for handles at that end unless handles at both ends are desired.

It will be apparent that my method provides a very large degree of flexibility in the arrangement of the feeding cutting and shaping instrumentalities used for forming the parts of the binder mechanism. While the method lends itself to the design of compact specialized machines for carrying it out, it may also be carried out by available general purpose cutters and shapers placed at variously arranged stations along and around the path of the wires 10 and 40. Since the free ends of toggle portions 21 and 41 are free for forming operations from substantially all angles and without limitation as to space, except the limitation imposed by the spacing of the rings on the wires 10 and 30, various forms of toggle hinge may be used on the practice of this method. The simple V connection shown has the advantage of not requiring any great precision in the assembly of the halves with each other or of both halves with plate 51.

What I claim is:

1. The method of making multi-prong frame assemblies for loose leaf binder mechanisms which comprises, welding a series of spaced, relatively short cross wires to a long wire at right angles thereto, said cross wires having portions extending from opposite sides of the long wire, the portions extending from one side being relatively shorter and of equal length and projecting sufficiently to provide toggle arms for the binder mechanism, bending the relatively longer extensions from the opposite side to substantially arcuate shape to form the paper receiving prongs of the binder mechanism, and shaping the ends of the toggle arm extensions to form one member of a toggle joint.

2. The method of making multi-prong assemblies for loose leaf binder mechanisms which comprises, welding a series of spaced, relatively short cross wires to a long wire at right angles thereto, said cross wires extending a greater distance from one side of the long wire than from the other, the short extensions being of equal length and positioned on the same side of the long wire, bending the long extensions to substantially arcuate shape to form the paper receiving prongs of the binder mechanism, and shaping the free ends of the prongs for interengagement with its mating prong in the binder mechanism, and shaping the ends of the short extensions to form one member of a toggle joint.

3. The method of making multi-prong assemblies for loose leaf binder mechanism which comprises, advancing a long wire intermittently, positioning relatively short spaced cross wires on the long wire, during periods of rest of the latter, at right angles thereto and with their end portions extending at each side of the long wire, the extension of said cross wires at one side of the long wire being greater at one side than at the other, the short extensions being of equal length and positioned on the same side of the long wire, securing the cross wires to the long wire as by welding at their intersections, and at subsequent periods of rest of the long wire, bending the long extensions of the cross wires to substantially arcuate shape to form the paper receiving prongs of the binder mechanism, and shaping the ends of the short extensions to form one member of a toggle joint.

4. The method of making multi-prong assemblies for loose leaf binder mechanisms which comprises, feeding a long wire intermittently, during periods of rest of the long wire feeding wires crosswise of the long wire at right angles thereto, welding the cross wires to the long wire at their intersections, and severing the cross wires to leave portions extending from opposite sides of the long wire, the extension at one side of the long wire being uniform and of a length to form a toggle arm for the binder mechanism, at subsequent periods of rest of the long wire bending those portions of the cross wires opposite the said toggle extensions into substantially arcuate shape to form paper receiving prongs of the binder mechanism, and during subsequent periods of rest of the long wire shaping the ends of said prongs for interengagement with other binder prongs and shaping the ends of the toggle projections to form one member of a toggle joint.

5. The method of making multi-prong assemblies for loose leaf binder mechanisms which comprises, arranging a pair of long wires in parallel spaced relation, advancing said wires intermittently, during periods of rest of the long wires feeding one or more wires from opposite sides of the pair of long wires of the adjacent long wire, the free ends of the cross wires on one long wire being spaced from the free ends of the cross wires on the other long wire, welding the cross wires to their respective long wires and severing the cross wires to leave portions extending outwardly from the long wires, at subsequent periods of rest of the long wires bending the outwardly extending portions of the cross wires into substantially arcuate shape to form paper receiving prongs of the binder mechanism, during subsequent periods of rest of the long wires shaping the ends of the inwardly extending portions of the cross wires on each long wire to form toggle joint connections with the ends of the inwardly extending portions of the cross wires on the other long wire, and finally cutting sections from the long wires, when the cross wires have been so formed into prong and toggle members, whereby the sections severed from the two long wires will combine to provide the multi-prong members of a loose leaf binder mechanism.

6. The method of making multi-prong assemblies for loose leaf binder mechanisms which comprises arranging a pair of long wires in parallel spaced relation, advancing said wires intermittently, during periods of rest of the long wires feeding one or more wires from opposite sides of the pair of long wires crosswise of the adjacent long wire, the free ends of the cross wires on one long wire being spaced from the free ends of the cross wires on the other long wire, welding the cross wires to their respective long wires and severing the cross wires to leave portions extending outwardly from the long wires, at subsequent periods of rest of the long wires bending the outwardly extending portions of the cross wires into substantially arcuate shape to form paper receiving prongs of the binder mechanism, during subsequent periods of rest of the long wires shaping the ends of the so formed prongs on each long wire for interengagement with the ends of the prongs on the other long wire and shaping the ends of the inwardly extending portions of the cross wires on each long wire to form toggle joint connections with the ends of the inwardly extending portions of the cross wires on the other long wire, and finally cutting sections from wires, when the cross wires have been so formed into prong and toggle members, whereby the sections severed from the two long wires will combine to provide the multi-prong members of a loose leaf binder mechanism.

JOHN SCHADE.